United States Patent [19]

Bell

[11] 4,095,675

[45] Jun. 20, 1978

[54] MULTI-SPEED PLANETARY DRIVE AXLE ASSEMBLY

[75] Inventor: Dale Kenneth Bell, Ortonville, Mich.

[73] Assignee: Rockwell International Corporation, Pittsburgh, Pa.

[21] Appl. No.: 709,446

[22] Filed: Jul. 28, 1976

[51] Int. Cl.² .............................................. F16H 1/44
[52] U.S. Cl. ...................................... 184/6.12; 74/695
[58] Field of Search .................. 184/6.12, 11 A, 11 B; 74/467, 695, 710

[56] References Cited

U.S. PATENT DOCUMENTS

| | | | |
|---|---|---|---|
| 1,623,212 | 4/1927 | Starr | 74/695 |
| 2,046,282 | 6/1936 | Wert | 184/6.12 X |
| 2,178,900 | 11/1939 | Starr | 74/695 X |
| 2,258,077 | 10/1941 | Taylor | 184/6.12 |
| 2,443,590 | 6/1948 | Alden | 74/695 |
| 2,730,914 | 1/1956 | Rockwell | 74/695 |
| 2,882,752 | 4/1959 | Russell | 74/695 |
| 3,195,371 | 7/1965 | Christie | 74/695 |
| 3,413,873 | 12/1968 | Bixby | 74/695 |
| 3,448,635 | 6/1969 | Nelson | 184/6.12 X |
| 3,762,503 | 10/1973 | Wilder | 184/6.12 |

*Primary Examiner*—David H. Brown

[57] ABSTRACT

A multi-speed drive axle assembly wherein the differential and planetary gear mechanism are mounted within a differential case rotatably mounted within a carrier secured to the drive axle housing. A plurality of lubricant inlet and outlet passages are provided through the end walls of the differential case to improve the flow of lubricant to and away from moving parts that are substantially enclosed by the differential case. The lubricant outlet passages are preferably located radially outward of the hub mounting the differential case and disposed at an angle to enhance the flow of fluid. A constant source of lubricant is also provided for the interior of the differential case.

4 Claims, 4 Drawing Figures

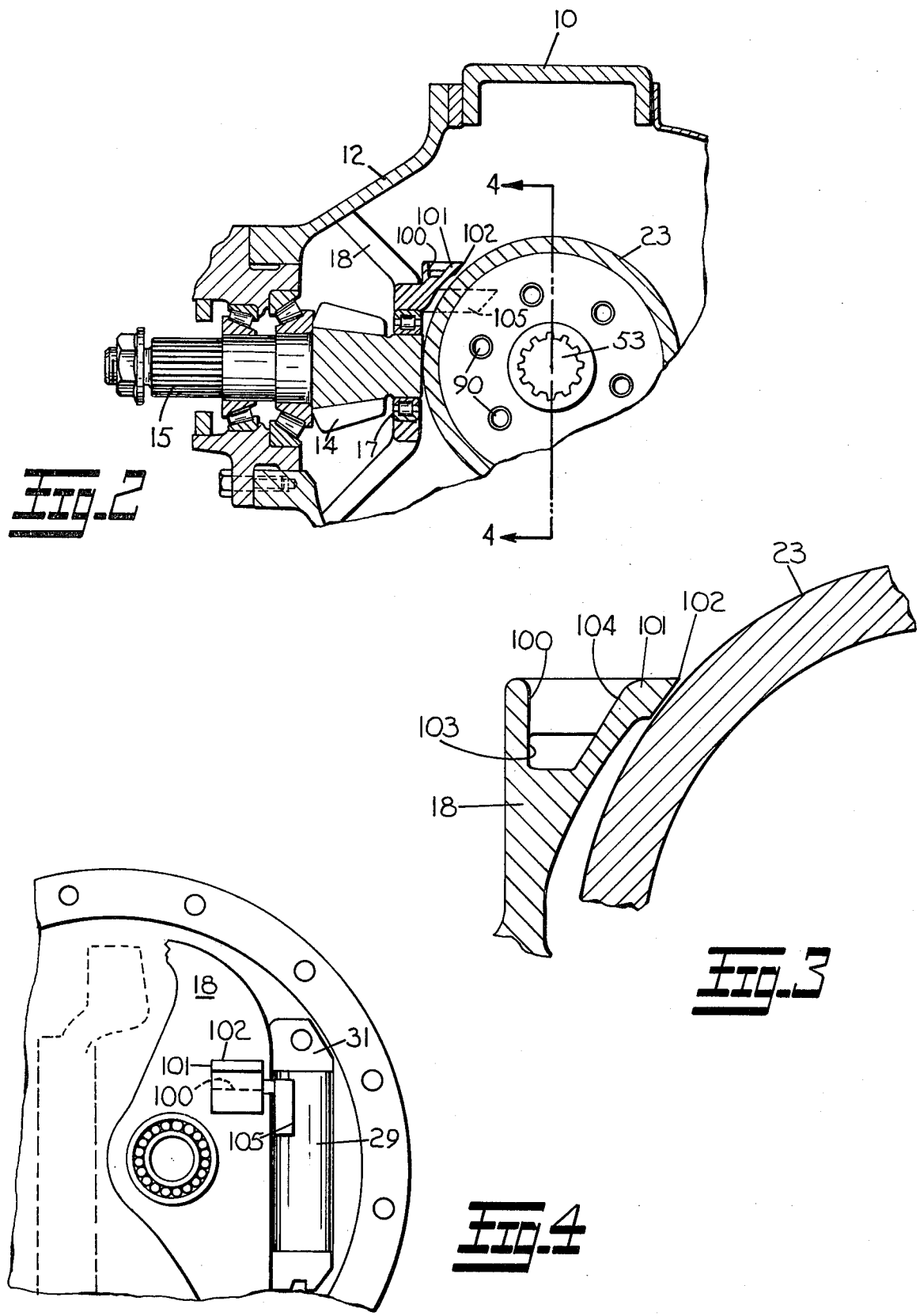

MULTI-SPEED PLANETARY DRIVE AXLE ASSEMBLY

BACKGROUND OF THE INVENTION

1. Field of the Invention

This invention relates to a multi-speed planetary drive axle assembly and, more specifically, to an improved system for lubricating the differential mechanism and planetary gear assembly within a substantially enclosed differential case.

2. Description of the Prior Art

U.S. Pat. No. 3,413,873 which issued to L. A. Bixby on Dec. 3, 1968 discloses a two speed planetary drive axle of the type to which the present invention is particularly applicable. The Bixby patent discloses a sleeve type sun gear which is axially movable between a high speed position where the sun gear sleeve is locked in position to rotate with the planetary gear assembly and a low speed position where the sleeve is locked against rotation relative to the axle housing. Planetary pinion gears rotatably mounted on shafts carried by a differential cage are meshed with the sun gear and an internal ring gear rigid with the differential case. The differential mechanism and the planetary gear assembly are substantially enclosed by the differential case which is rotatably mounted to a differential carrier.

The axle housing is fluid tight and a pool or sump of liquid lubricant is provided for the purpose of lubricating the drive assembly as the lubricant is splashed about the housing by the moving parts. This has proven to be an effective means of lubricating those parts of the drive assembly which are exposed to the lubricant. The differential case shields the differential mechanism and the planetary gear assembly from the lubricant splashed about the axle housing and presents a special problem with respect to lubricating the moving parts within the differential case. The problem is not merely one of providing lubricant to the interior of the differential case but rather to provide a continuous flow of lubricant through the case at such a rate as to prevent the temperature of the lubricant and moving parts within the differential case from increasing to an undesirable level.

U.S. Pat. No. 2,178,900 which issued to C. E. Starr on Nov. 7, 1939 discloses a lubricating system for a multi-speed planetary drive axle. The Starr patent discloses a lubricating system in which lubricant is introduced to the interior of a differential case by means of inlet passages provided through one end wall of the differential case and discharged through an outlet passage formed by a groove cut between the sun gear sleeve and the internal surface of a boss rotatably mounting one end of the differential case on the sleeve. Starr discloses that lubricant will pass from the inlet passages through the differential case and then through the outlet passage where it is returned to the axle housing. However, the Starr discharge passage is provided at the outer surface of the sun gear sleeve which is located radially inward of the differential case wall. In operation, lubricant within the differential case would be moved by centrifugal force toward the outer wall of the rotating differential case. Such movement would be in a radially outward direction away from the sun gear sleeve and the discharge passage with the result that little if any lubricant would be discharged to the axle housing before the differential case became almost full of lubricant. The rate of lubricant flow through the differential case is also limited by the location of the Starr discharge passage.

SUMMARY OF THE INVENTION

The invention provides an improved lubricating system for a multi-speed planetary drive axle in which a plurality of lubricant inlet passages are provided through one end wall of a differential case and a plurality of lubricant outlet passages are provided through the other end wall. The lubricant outlet passages are spaced radially outward and around a boss rotatably mounting the differential case. In the preferred embodiment the lubricant outlet passages are provided adjacent the wall joining the end walls of the differential case and diverge outward relative to the axis of the differential case to enhance the flow of lubricant from the differential case.

Lubricant is provided to the inlet passages by a sloping passage leading from a lubricant pocket located above the axis of the differential case. Lubricant is provided to the pocket by a portion of an internal wall of the differential carrier which is formed to project into close proximity with the differential case. An edge of the projection scrapes lubricant from the differential case. Lubricant flows down the projection to the pocket and then to the differential case.

The invention and the advantages provided thereby will be more readily understood from the following description and claims.

BRIEF DESCRIPTION OF THE DRAWINGS

Referring to the drawings wherein like numerals designate like parts:

FIG. 2 is a section taken along the line 2—2 of FIG. 1;

FIG. 3 is an enlarged view showing parts of the lubricating system of FIG. 2 in greater detail; and FIG. 4 is a section taken along the line 4—4 of FIG. 2 with the differential case and axle shafts removed for purposes of clarity.

DESCRIPTION OF THE PREFERRED EMBODIMENT

Figure 1:
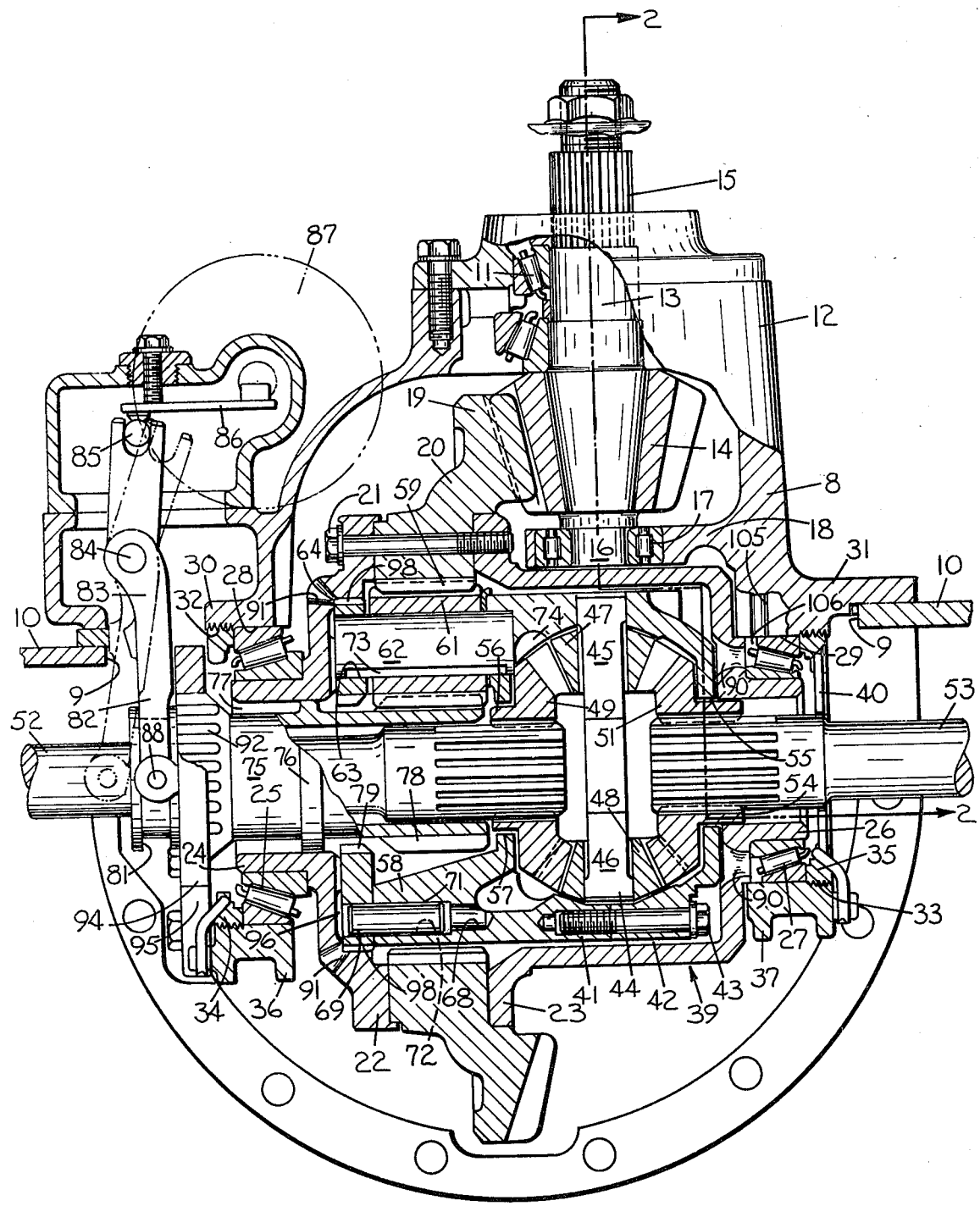
FIG. 1 is a plan view partly cut away and sectioned showing a two speed planetary drive assembly for a vehicle drive axle.

In FIG. 1 there is shown a two speed planetary drive axle assembly mounted to a vehicle axle housing 10. The planetary gear and the differential mechanism are rotatably mounted within a differential carrier 8 which, in turn, is mounted to extend over the front opening 9 of axle housing 10 where it is rigidly secured in conventional manner by a plurality of bolts. The differential carrier 8 is formed with a reduced forwardly extending neck portion 12. An input pinion shaft 13 is rotatably mounted within the neck portion 12 by tapered roller bearings 11. The end 15 of pinion shaft 13 projects forwardly of the differential carrier 12 and is splined for connection to a propeller shaft by means of a universal joint connection.

The inner end 16 of pinion shaft 13 is mounted by antifriction bearings 17 in an internally projecting integral housing member 18, so that a straddle mount is provided for effective alignment retaining support of the pinion shaft.

The pinion gear 14, formed integrally with shaft 13, is constantly meshed with a bevel ring gear 19. Gear 19 has a body 20 axially clamped, as by bolt assemblies 21, between the opposite end members 22 and 23 of a differential case. As will appear, gear body 20 and the differential case end members 22 and 23 cooperate to define an elongate housing symmetrical about a longitudinal axis and substantially enclosing the differential mechanism and the planetary gear mechanism within the drive axle housing 10.

The differential case is mounted for rotation about an axis perpendicular to the plane containing the axis of pinion shaft 13, the differential case being rotatably mounted at opposite ends by boss 24 of case member 22 extending into the tapered roller bearing assembly 25 and boss 26 of differential case member 23 extending into the tapered roller bearing assembly 27. Bearing assemblies 25 and 27 are coaxially mounted in aligned relation in bores 28 and 29 respectively of inwardly projecting generally parallel arms 30 and 31 formed integrally with the differential carrier 8. The outer ends of these bores are threaded at 32 and 33 to receive annular bearing adjustment and retainer nuts 34 and 35 which when properly tightened locate and preload the bearings. An apertured disc 40 is secured to the retainer nut 35.

Bores 28 and 29 are cylindrical, the upper halves being formed directly in arms 30 and 31 and the lower halves being formed in separable bearing caps 36 and 37 secured upon the undersides of the arms.

The portion of the differential case as shown to the right in FIG. 1 surrounds a differential gear support in the form of a cage 39 comprising opposed sides 41 and 42 secured together by bolt assemblies 43 to clamp a cross member 44 between them. Two arms 45 and 46 of the cross arm member are shown rotatably mounting differential pinions indicated at 47 and 48. All four pinions are meshed with differential side gears 49 and 51 splined to oppositely extending axle drive shafts 52 and 53, respectively. Shafts 52 and 53 transmit power to the road engaging wheels rotatably mounted at the ends of the axle housing 10.

The hub 54 of the gear 51 is journaled in bore 55 of the differential cage side 42. The hub 56 of side gear 49 is journaled coaxially in a bore 57 formed in the differential cage side 41.

Differential cage side member 41 has an integral projecting end section 58 serving as a carrier for the planetary gearing to be described. Gear 19 is formed with a row of internal teeth 59 whereby it serves as the planetary ring gear. The internal ring gear 59 is constantly meshed with a plurality of planetary pinion gears 61 that are freely rotatably mounted on shafts 62 fixed in the differential cage side member 41. The planetary pinion shafts 62 extend into apertures 63 in a carrier end plate 64 that is secured to carrier 58 by a plurality of machine screws. Shafts 62 are locked against rotation relative to the planetary gear carrier 58 by conventional means. Carrier 58 is also formed with one or more axially extending through bores 68 aligned with bores 69 in the end plate for receiving dowel pins 71 having central lubricant conducting passages 72 in the form of axially extending through bores. Each planetary pinion shaft 62 is machined to provide at least one longitudinally extending flat surface 73. The flat surface 73 is spaced from the bore at each pinion gear 61 to provide a passage supplying lubricant between the shaft 62 and the pinion gear. The passages 72 and 73 open into a space 74 within the differential cage and provide a conduit for lubricant to flow from that space to the bearing surfaces within the planetary pinion gears 61.

A hollow sleeve 75 is concentric with axle shaft 52 in free spaced relation thereto and is formed with a raised annular rib 76 slidably guiding it within the bore 77 of the differential case end boss 24. At its inner end sleeve 75 is formed with a circular row of teeth 78 forming a sun gear constantly meshed with and slidable relative to the planetary pinion gears 61. Carrier end plate 64 is formed with an internal row of teeth 79 that, as will appear, are adapted to coact as clutch teeth with the sun gear teeth 78 to lock the sun gear sleeve 75 to the end plate 64 for rotation with the planetary carrier formed by end plate 64 and end section 58 of the differential cage side member 41 in one axial position of sleeve 75.

Where it projects out of the differential case end boss 24, sleeve 75 is formed with clutch teeth 92 and an annular groove 81 receiving a yoke 82 on the end of a lever 83. The lever 83 is pivotally mounted at 84 and is operatively connected to the sun gear sleeve by two pins 88. The inner ends of the pins are seated in the annular groove 81 and translate the arcuate movement of lever 83 into axially reciprocating movement of the sun gear sleeve 75.

The lever 83 may be actuated by electric or pneumatic means. In the preferred embodiment the lever is connected at 85 to a bell crank lever 86 which, in turn, is operated by the reciprocable plunger of a shaft actuating unit in the form of an air motor 87.

In operation, unit 87 is actuated to move the lever 83 about the pivot 84 and shift the sun gear sleeve between two axially spaced operative positions within the axle housing. In FIG. 1, the sun gear sleeve 75 is shown in the low speed position where the clutch teeth 92 of sleeve 75 are engaged with the clutch teeth 94 of lock plate 95. In this position the sun gear sleeve is locked against rotation relative to the differential carrier. Drive is transmitted through the pinion 14 to the ring gear 19 which rotates the differential cage and the idling planet gears around the sun gear teeth 78.

When the unit 87 is actuated to shift the sun gear sleeve to the other operative position, the lever 83 is moved clockwise about the pivot 84 to the position shown by phantom lines in FIG. 1. In this movement, the clutch teeth 92 are withdrawn from the lock plate clutch teeth 94 and the sun gear teeth 78 are engaged with the internal row of teeth 79 provided to the planetary carrier end plate 64. In this, the high speed position, the sun gear sleeve is locked to the planetary carrier end plate and rotates with the planetary carrier. The planetary pinion gears are thus driven at a higher rate of speed between the internal ring gear teeth 59 and the rotating sun gear teeth 78.

The axle housing and differential carrier assembly are fluid tight. The assembly serves as a sump for a pool of liquid lubricant in the form of lubricating oil. The oil is filled to a level about one to one and one-half inches below the centerline of the axle drive shafts. The pinion gear 14 and the differential case rotate through the pool of oil splashing the oil about the interior of the axle housing and the differential carrier.

The improved system for lubricating the moving parts within the differential case will now be described. A plurality, preferably six lubricant inlet passages 90 are provided through the end wall of the differential case extending radially outward from the boss 26 of case member 23. For lubricant outlet passages 91 are provided through the other end wall of the differential case which extends radially outward from the boss 24 of case member 22. The lubricant outlet passages 91 are spaced radially outward from the hub 24 and circumferentially around that end wall of the differential case. The outlet passages 91 are located at the juncture of the end wall with the flange secured to the ring gear body 20 and extend through the end wall at an angle diverging outward relative to the axis of rotation of the differential case.

A shallow annular groove 96 is provided on the interior surface of differential case end member 22. The groove distributes lubricant between the differential case member 22 and the planetary carrier end plate 64. The groove may be common to the interior ends of the lubricant outlet passages 91 and in that arrangement serves as a lubricant discharge groove. A plurality of slots or grooves 98 extend axially across the peripheral edge of the planetary carrier end plate 64.

Lubricant for the interior of the differential case is collected in a pocket 100 formed on the differential carrier housing member 18. As best shown by FIGS. 2 and 3, a portion 101 of the housing member 18 is formed to project into close proximity with the external surface of differential case member 23. The edge 102 of projection 101 is spaced about one thirty-second of an inch away from the differential case member 23. The edge 102 is located vertically about one and three quarters of an inch above the centerline of the drive axle shafts 52, 53.

As the axle assembly is driven by pinion gear 14, the edge 102 scrapes lubricant from the differential case member 23. the lubricant flows down inclined surface 104 to the pocket 100. The pocket 100 and inclined surface 104 may also receive lubricant splashed about the interior of axle housing and differential carrier and draining from the housing member 18. The lubricant flows through an opening 103 at one end of pocket 100 to a passage 105 through the differential carrier arm 31. The passage 105 is open at its other end to a space 106 between the tapered bearing 27 and the lubricant inlet passages 90 in the differential case end wall.

Thus, by means of positive gravity feed, lubricant from the pocket 100 flows through the passage 105 to the space 106 where it is delivered to the tapered roller bearing 27 and the lubricant inlet passages 90. The apertured disc 40 restricts lubricant flow through the bearing assembly 27 and maintains a constant source of lubricant for the inlet passages and the space 106. The lubricant is delivered through the passages 90 to the interior of the differential case where it freely circulates through and around the differential cage 39. The space 74 receives lubricant flowing through the cage 39 and delivers lubricant to the passages 72 through dowel pins 71 and the passages provided by flat surfaces 73 of the planetary pinion shafts 62. Lubricant from the passages 72 and 73 is collected by the annular discharge groove 96 and flows through the outlet passages 91 where it is returned to the sump. Lubricant flowing around the differential cage 39 serves to lubricate the planetary pinion gears 61 and the internal ring gear 59 and then passes through the grooves 98 across the peripheral edge of planetary carrier end plate 64 to the lubricant outlet passages 91 where it is also returned to the sump.

The invention thus provides a differential case for a multispeed planetary drive axle which improves the flow of lubricant to and away from moving parts that are substantially enclosed by the differential case. The lubricant outlet passages located radially outward of the hub mounting the differential case provide for a relatively high rate of lubricant flow through the differential case and prevent the temperature of the lubricant and moving parts within the differential case from increasing to an undesirable level. The positive gravity feed of lubricant from the pocket 100 and the apertured disc 40 provide a constant source of lubricant for the interior of the differential case.

The invention may be embodied in other forms without departing from the spirit or essential characteristics thereof. The foregoing description is therefore to be considered as illustrative and non-restrictive, the scope of the invention being defined by the appended claims and all changes to the described embodiment which come within the meaning and range of equivalency of the claims are therefore intended to be embraced thereby.

I claim:

1. In a multi-speed drive axle assembly of the type comprising an axle housing for holding a pool of lubricant, a differential carrier mounted to said housing; a differential case having a pair of oppositely disposed substantially parallel end walls, a boss extending axially outward from each of said end walls and being rotatably mounted in bearings seated in said differential carrier, a differential cage including a pair of side members rotatably supporting a differential mechanism within said differential case and adjacent one end wall of said differential case, a planetary reduction within said differential case and adjacent the other said end wall of said differential case, said planetary reduction including a plurality of pinion gears with each pinion gear mounted for rotation about a shaft, each said shaft being seated at one end in an aperture provided to one of said differential cage side members and the other end of each shaft being seated in an aperture provided to an end plate secured to said one differential cage side member, said end plate being closely adjacent and substantially parallel to said other end wall of said differential case and having an outer peripheral edge in close proximity to an interior surface of said differential case, a plurality of grooves extending axially across the outer peripheral edge of said end plate, a plurality of lubricant inlet passages through said one end wall of said differential case, a groove formed on the interior surface of said one differential cage side member and common to said apertures mounting said pinion gear shafts, a lubricant passage extending axially along each of said pinion shafts interiorly of its respective pinion gear, a plurality of lubricant outlet passages through said other end wall of said differential case, said outlet passages being spaced radially outward from said pinion shafts, a lubricant discharge groove on the interior surface of said other end wall of said differential case, said discharge groove being common to said outlet passages and means providing lubricant at said lubricant inlet passages whereby said lubricant will flow into said differential case and said differential cage and radially outward from said groove on the interior surface of said one differential cage side member through said passages along said pinion shafts and through said grooves extending axially across the outer peripheral edge of said end plate to said discharge groove and said lubricant outlet passages.

2. The multi-speed drive axle assembly defined by claim 1 wherein said lubricant passage along each of said pinion shafts is provided between a flat surface on the pinion shaft and the bore of its respective pinion gear.

3. The multi-speed drive axle assembly defined by claim 1 wherein said lubricant outlet passages diverge outwardly at an angle to the axis of rotation of said differential case to enhance the flow of lubricant from the interior to the exterior of said differential case during rotation about said axis.

4. The multi-speed drive axle assembly defined by claim 1 wherein said means providing lubricant is a pocket formed on an interior wall of said assembly and a projection extending from said wall into close proximity with said differential case, said projection including an edge for scraping lubricant from said case and an inclined surface directing said lubricant to said pocket.

* * * * *